United States Patent [19]

Jatczak et al.

[11] Patent Number: 4,601,592
[45] Date of Patent: Jul. 22, 1986

[54] TAPERED ROLLER BEARING CAPABLE OF SUSTAINED OPERATION WITHOUT LUBRICANT REPLENISHMENT

[75] Inventors: Chester F. Jatczak; Peter W. Lee, both of Canton; Peter S. Orvos, Uniontown, all of Ohio

[73] Assignee: The Timken Company, Canton, Ohio

[21] Appl. No.: 578,025

[22] Filed: Feb. 8, 1984

Related U.S. Application Data

[63] Continuation-in-part of Ser. No. 359,165, Mar. 17, 1982, abandoned.

[51] Int. Cl.⁴ .................. F16C 33/58; F16C 33/36; F16C 33/66
[52] U.S. Cl. ................................. 384/564; 384/571; 384/902
[58] Field of Search ............... 308/187, 216, DIG. 5, 308/DIG. 11, 243, 211, 213, 214, 217, 218, 195; 384/564, 569, 571, 902

[56] References Cited

U.S. PATENT DOCUMENTS

| | | | |
|---|---|---|---|
| 2,785,023 | 3/1957 | Naumann | 308/187 |
| 3,582,164 | 6/1971 | Derner | 308/201 |
| 3,630,584 | 12/1971 | McKee | 308/187 |
| 3,675,978 | 7/1972 | McKelvey | 308/214 |
| 3,782,795 | 1/1974 | Richey et al. | 308/214 |
| 3,811,743 | 5/1974 | Wren | 308/187 |
| 4,226,484 | 10/1980 | Glassow | 308/201 |

FOREIGN PATENT DOCUMENTS

| | | | |
|---|---|---|---|
| 23641 | 2/1981 | European Pat. Off. | 308/214 |
| 2095726 | 1/1972 | France . | |
| 2188725 | 1/1974 | France . | |
| 70259 | 6/1977 | Japan | 308/DIG. 5 |
| 1396220 | 6/1975 | United Kingdom . | |
| 2014252 | 8/1979 | United Kingdom | 308/214 |

Primary Examiner—Stuart S. Levy
Assistant Examiner—Thomas R. Hannon
Attorney, Agent, or Firm—Gravely, Lieder & Woodruff

[57] ABSTRACT

A tapered roller bearing has a porous rib ring against which the large ends of its wrought steel tapered rollers bear so that the ring prevents the rollers from being expelled. The rib ring is formed from porous powdered steel that has been compacted to a density of about 70% to 85% of theoretical and then sintered and machined. Thereafter, the machined rib ring is etched to expose the pores at the surface against which the large ends of the rollers bear. Finally, the rib ring is impregnated with oil. Should the bearing lose its normal supply of lubrication, the critical region of contact between the abutment face on the rib ring and the large ends of the rollers will nevertheless be adequately lubricated for a reasonable time by lubricant which escapes from the pores of the rib ring. The cage of the bearing may be piloted by the rib ring and by a ring-like cup insert that is formed in the same manner as the rib ring.

12 Claims, 2 Drawing Figures

TAPERED ROLLER BEARING CAPABLE OF SUSTAINED OPERATION WITHOUT LUBRICANT REPLENISHMENT

RELATED APPLICATION

This application is a continuation-in-part of application Ser. No. 359,165 of Chester F. Jatczak, Peter W. Lee, and Peter S. Orvos, filed Mar. 17, 1982 now abandoned, and entitled Tapered Roller Bearing Capable of Sustained Operation Without Lubricant Replenishment.

BACKGROUND OF THE INVENTION

This invention relates in general to antifriction bearings and, more particularly, to a tapered roller bearing that is capable of sustained operation in the absence of its normal supply of lubrication.

Tapered roller bearings offer many advantages which other types or combinations of bearings do not. For example, a pair of tapered roller bearings will carry extremely heavy radial and thrust loading, and the individual bearings may be adjusted against one another to control radial and axial play. Due to their large load carrying capacity in both radial and axial directions, it is often possible to replace a combination of three other bearings with only two tapered roller bearings and still achieve the desired bearing life.

Due to the tapered configuration of the rollers radial loads on the rollers create an axial force component which tends to expel the rollers from the annular space between the two races, that is, from between the cup and cone. This expulsion force is resisted by means of a thrust rib on one of the races, usually the cone. Thus, as the cup and cone rotate relative to each other the large diameter end faces of the tapered rollers experience rolling and sliding contact against the thrust rib. Unless a film of lubricant is maintained between the roller end faces and the thrust rib, the bearing will overheat and sustain damage.

In some machinery it is important to have safety features which will enable the machinery to operate even though its lubricating system is disabled. This is particularly true of helicopters.

SUMMARY OF THE INVENTION

One of the principle objects of the present invention is to provide a tapered roller bearing that will remain operable for a reasonable time after the loss of normal lubrication. Another object is to provide a bearing of the type stated that may be operated at high angular velocities while carrying heavy loads. A further object is to provide a bearing of the type stated that affords adequate time to recognize the disruption of lubrication to it and also adequate time to shut down machinery into which it is incorporated so that the machinery is not damaged. An additional object is to provide a bearing of the type stated that is simple in construction and relatively easy to manufacture. These and other objects and advantages will become apparent hereinafter.

The present invention is embodied in a tapered roller bearing having a rib ring along which the rollers run, with the ring having pores that are exposed at the surface against which the large ends of the rollers bear, so that the rib ring will absorb a lubricant and release it to lubricate the roller ends when the bearing loses its normal supply of lubrication. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur

DETAILED DESCRIPTION

Figure 1:
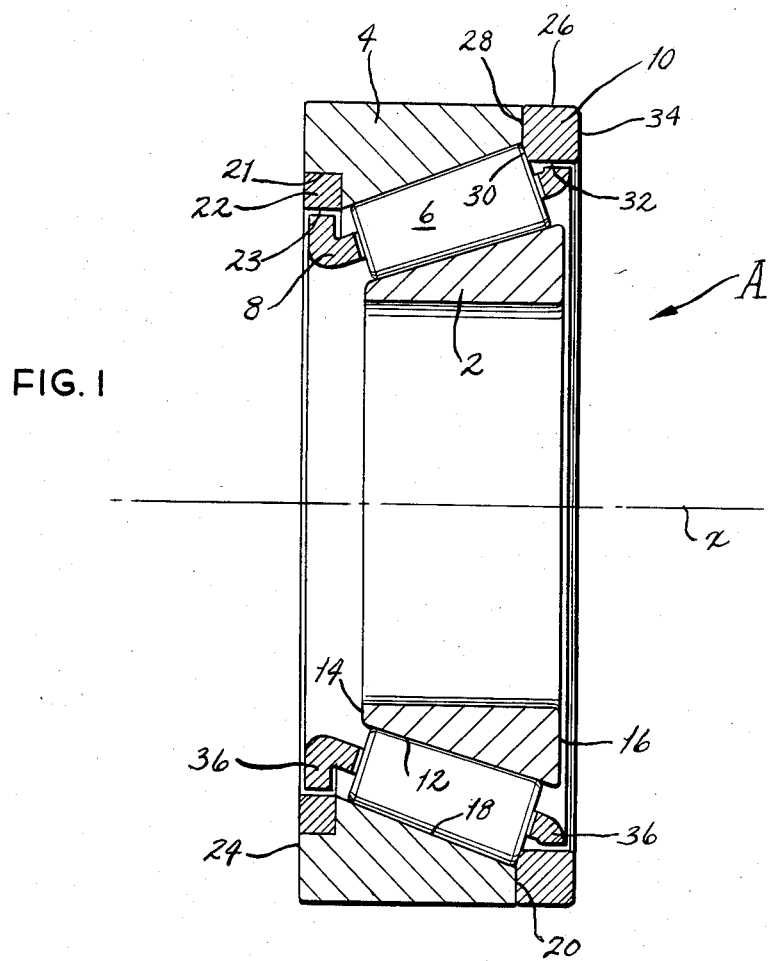
FIG. 1 is a sectional view of a tapered roller bearing having a thrust rib and an insert formed from an oil-impregnated porous steel and otherwise being constructed in accordance with and embodying the present invention.
Figure 2:
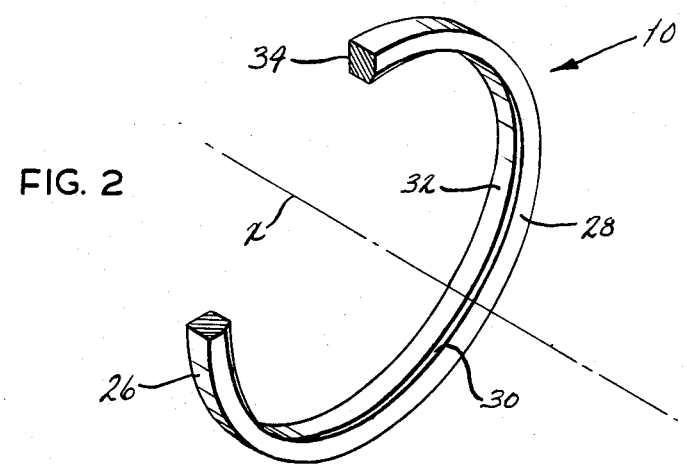
FIG. 2 is a perspective view, partially broken away and in section, of the rib ring.

Referring now to the drawing, a single row tapered roller bearing A has an axis X of rotation and is designed to carry both radial loads and thrust loads and to do this for a reasonably long time after the normal supply of lubrication to the bearing A is terminated. The bearing A includes several basic components, namely, a cone 2, a cup 4 that surrounds the cone 2, a complement of tapered rollers 6 arranged in a single row between the cone 2 and cup 4, a cage 8 for maintaining the correct spacing between the rollers 6, and a rib ring 10 that serves as an abutment for preventing the rollers 6 from being expelled from the space between the cone 2 and cup 4.

Preferably the cone 2 and cup 4 are formed from a high quality wrought bearing steel of the type commonly used in bearings. The cone 2 has a tapered raceway 12 which at its small end runs out to a cone front face 14 and at its large end runs out to a cone back face 16. Both of the cone end faces 14 and 16 are perpendicular to the axis X. The cup 4, likewise, has a tapered raceway 18 which at its large end runs out to a cup front face 20. Its small end is located adjacent to a rabbet 21 which opens out of the end of the cup 4. The rabbet 21 contains an insert 22 having two exposed surfaces, one being a cylindrical surface 23 that is presented inwardly toward the axis X of rotation and merges with the large end of the tapered raceway 18. The other exposed surface is along and indeed forms part of the cup back face 24. Again both end faces 20 and 24 are squared off with respect to the axis X. Thrust loading and reaction loads derived from radial loads are transmitted through the cone back face 16 and cup back face 24. The raceways 12 and 18 are on apex, meaning that if each is extended to an apex, those apexes will be located at a common point along the axis X of rotation.

The tapered rollers 6 occupy the space between the cone 2 and cup 4 and along their tapered side faces contact the two raceways 12 and 18, there being line contact between each roller 6 and the raceways 12 and 18. Since the raceways are on apex, rolling contact will occur between the roller bodies and the raceways 12 and 18 when the cup 4 rotates relative to the cone 2 or vice-versa. The rollers 6 are axially positioned by the rib ring 10 against which the large diameter ends of the rollers 6 bear. In this regard, the large diameter ends of the rollers 6 are somewhat spherical, for that configuration maintains the rollers 6 in the proper orientation between the raceways 12 and 18. Like the cone 2 and cup 4, the rollers 6 are preferably formed from wrought steel of a high quality bearing grade.

The cage 8 tapers to conform generally with the angular disposition of the rollers 6 and has pockets in which the rollers 6 are received. At each of its ends, the cage 8 turns outwardly to provide end rings 36. The large diameter end ring 36 is located in close proximity to the inside face of the rib ring 10 while the small diameter end ring 36 is located in close proximity to the cylindrical surface 23 on the insert 22 of the cup 4. Indeed, the rib ring 10 and insert 22 serve to position the cage 8 in the radial direction so that the cage 8 is in effect piloted. The cage 8 is preferably made of steel.

The rib ring 10 fits against the front face 20 of the cup 4 and projects inwardly beyond the large end of the cup raceway 18 so as to prevent the rollers 6 from moving axially out of the annular space between the cone 2 and cup 4. In the actual operation of the bearing A the cup 4 and rib ring 10 are clamped together so that the force exerted on the rib ring 10 by the rollers 6 does not separate the ring 10 from the cup 4. The rib ring 10 is of unitary construction and includes a cylindrical outer surface 26 which is the same diameter as the outer surface of the cup 4. It also has an end face 28 which is squared off with respect to the axis X, and it is along this face that the ring 10 abuts against the front face 20 of the cup 4. The end face 28 merges into a roller abutment face 30 which is generally perpendicular to the cup raceway 18 and hence oblique to the axis X of rotation. The abutment face 30 extends inwardly to a cylindrical inner face 32 which serves as a guide for the large end of the cage 8. Finally the ring 10 has a front face 34 which is parallel to the end face 28 and extends between the outer and inner cylindrical surfaces 26 and 32.

Unlike the cone 2, the cup 4, and the tapered rollers 6, the rib ring 10 is formed from a porous alloy steel that has been impregnated with a liquid lubricant. Moreover, the pores of the steel are exposed at least along the roller abutment face 30, and the cylindrical inner face 32 as well. The pores hold the liquid lubricant. The insert 22 is formed from the same porous alloy steel that has likewise been impregnated with a liquid lubricant, and its pores are exposed at least along th cylindrical surface 23.

During operation of the bearing A the cone 2 rotates within the cup 4 or the cup 4 revolves around the cone 2. In either case, the tapered rollers 6 roll along the two raceways 12 and 18, there being rolling contact, that is no significant sliding, between the tapered bodies of the rollers 6 and the raceways 12 and 18. The large diameter end faces of the rollers 6 bear against the abutment face 30 of the rib ring 10, and thus the ring 10 positions the rollers 6 in the axial direction. In this regard, any radial load that is applied to the bearing A will be transmitted through the rollers 6, and by reason of the tapered geometry, this load is translated into a radial component and an axial component at the rollers 6, with the axial component being directed toward the large ends of the raceways 12 and 18. Indeed, the axial component constitutes an expulsion force which would drive the rollers 6 out of the bearing A were it not for the obstruction caused by the abutment face 30 of the rib ring 10. In contrast to the rolling contact between the rollers 6 and the raceways 12 and 18, the contact between the large end faces of the rollers 6 and the abutment face 30 is combined sliding and rolling. Since the cage 8 is piloted by the rib ring 10 and the cup insert 22, sliding contact exists between the end rings 36 on the cage 8 and the cylindrical surface 23 of the cup insert 22 and the cylindrical face 32 of the rib ring 10.

Normally, a liquid lubricant is introduced into the bearing A at the small ends of the raceways 12 and 18 and is pumped through the bearing A by the natural pumping action of the rollers 6. This lubricant forms a thin, low friction, film along the surfaces at which rolling and sliding contact exist in the bearing A—namely along the raceways 12 and 18, along the abutment face 30, and along the cylindrical surfaces 23 and 32.

Should the bearing A lose its normal supply of lubrication, the lubricant retained within the pores of the rib ring 10 will emerge from the pores of the rib ring 10 at the abutment face 30 and for a reasonable time will supply sufficient lubrication to prevent excessive friction from developing between the large ends of the rollers 6 and the abutment face 30. Indeed, even at high speeds and under heavy radial and thrust loads the bearing A will operate for at least 30 minutes without failure. This provides adequate time to recognize the loss of the normal supply of lubricant and to shut down the machinery containing the bearing A without damaging that machinery.

Not only does the rib ring 10 supply lubrication to the large ends of the rollers 6, but it also supplies lubrication to the large and small end rings 36 of the cage 8. This prevents excessive friction from developing between the large end ring 36 and the cylindrical inner face 32 of the rib ring 10 and from likewise developing between the small end ring 36 and cylindrical surface 23 of the cup insert 22. Having adequate lubrication in these regions is also important, for it is along the surface 23 and face 32 that the cage 8 is piloted. Without adequate lubrication, the cage 8 could weld to the rib ring 10 and insert 22.

Perhaps the best procedure for manufacturing the rib ring 10 is to compress a suitable powdered metal, such as a powdered high strength, high temperature, bearing steel, into a ring form that roughly approximates the rib ring 10, but is slightly larger in cross-section. The compression should be sufficient to compact the powder to a density of between 70% and 85% of the maximum possible or theoretical density, which would be the density of comparable wrought steel. The metal powder contains a lubricant so that the powder flows with relative ease within the die in which the compaction takes place. This results in a ring form of uniform density. Once the ring form is acquired, it is heated to between 1350° F. and 1500° F. to eliminate the lubricant that is within the compacted metal powder.

Next the ring form is sintered by heating it still further within a vacuum or in a reducing atmosphere to between 2000° F. and 2200° F. for at least 20 minutes. It is then cooled to about 1000° F. in a vacuum and then to room temperature in nitrogen gas.

Thereafter, the sintered ring form is heat treated by heating and quenching, and the temperature to which it is heated and the composition of the quenching medium are to a large measure determined by the metal of the ring form.

Either before or after the heat treatment, and preferably after, the sintered ring form is machined to bring it to the proper configuration and dimensions. This machining may be along all of the faces 26, 28, 30, 32, and 34, and most certainly should be along the abutment face 30 against which the tapered rollers 6 bear, along the end face 28 at which the rib ring 10 is fitted against the cup 4, and along the cylindrical inner face 32 which pilots the cage 8. The machining may involve both turning and grinding, and certainly grinding. Both of these machine operations tend to obliterate the pores at the machined surface. In other words, the turning and grinding tend to smear over and cover the pores, producing a thin metal surface layer which is commonly referred to as the "Beilby layer".

The Beilby layer inhibits the absorbtion of a lubricant by the rib ring 10, and much worse prevents the lubricant from being released at the critical abutment face 30 once it has been absorbed. To overcome this problem, the Beilby layer is removed by immersing the machined ring form in a suitable etchant. In the alternative, the Beilby layer may be removed by mechanically etching the ring form along the surfaces 30 and 32, and this may be achieved by subjecting the ring form to ionized gas molecules.

Once the ring form is removed from the etchant, the etchant remaining on it is neutralized. After cleaning the ring form, it is impregnated with lubricant by immersing it within a suitable liquid lubricant which has been warmed to about 300° F. to reduce its viscosity. This produces the rib ring 10 for the bearing A.

The insert 22 is formed in essentially the same manner, it being etched at least along its inwardly presented cylindrical surface 23. It is inserted into the rabbet 21 of the cup 4 and welded in place.

Suitable material for the rib ring 10 and insert 22 are powders of high quality steel such as M2, CBS1000M and 46100. CBS1000M is the trademark of The Timken Company, Canton, Ohio. Irrespective of the material from which the rib ring 10 is formed, that material should be porous, and the pores should hold a liquid lubricant and be exposed at a surface where the material is free to bear against another machined surface, such as a ground surface on wrought bearing steel. Moreover, the material should be capable of bearing against the wrought bearing steel with a force that translates into a contact stress of at least 40,000 lb/in$^2$. When the impregnated material along the surface at which its pores are exposed bears against a ground surface on wrought bearing steel, the coefficient of friction at the contacting surfaces should not exceed about 0.10 in the absence of all lubrication other than the lubricant derived from the pores of the impregnated material. Finally, the impregnated material when against a ground surface on wrought bearing steel should be capable of enduring for at least 30 minutes a pressure-velocity multiple of $22 \times 10^6$, where, pressure is measured in lb/in$^2$ and velocity in ft/min. The pressure is of course the contact stress, while the velocity is the relative lineal velocity between the impregnated material and the wrought bearing steel at the surfaces along which they are in contact. Where these surfaces are circular, the lineal velocity is measured along the outer diameter, that is at the location of the maximum velocity, although in the case of a relatively narrow rib ring or thrust rib for a tapered roller bearing, it is acceptable to measure the lineal velocity at the rib pitch circle, which is generally speaking the median diameter of the face against which the large end faces of the rollers bear. In other words, the impregnated material and the wrought bearing steel, when operated under conditions at which pressure multiplied by the velocity is $22 \times 10^6$, should continue to operate for at least 30 minutes without any significant damage to either the impregnated material or the wrought bearing steel.

The tool steel alloy known as M2 has essentially the following composition by weight.

| C | .85% | Mo | 5.0% |
|---|------|----|------|
| Mn | .30% | W | 6.3% |
| Si | .30% | V | 1.85% |
| Cr | 4.15% | Fe | balance |

To convert M2 powder into a rib ring 10 or insert 22, the powder is first blended with a lubricant, such as the one sold under the trademark Acrawax. The lubricant should amount to about 0.5% to about 1.5% by weight of the powder. The blend of M2 powder and lubricant is then compacted in a die to provide a ring form having the general shape of the desired rib ring or insert. The density of this ring form should be between about 70% and 85% of theoretical density, and should preferably be about 75% of theoretical. Next the compacted ring form is heated to 1350° F. to 1500° F. in a vacuum and maintained at that temperature for 30 to 60 minutes to eliminate the lubricant used in the compacting step. Thereafter the ring form is heated to at least 2000° F. in a vacuum and maintained at that temperature for 15 to 45 minutes to sinter the ring form. At the end of this time it is cooled to about 900° F. in a vacuum and then to room temperature in nitrogen gas.

Next, the sintered ring form is heat treated by preheating it to about 1450° F. in a vacuum and maintaining it at that temperature for about 30 minutes. Then its temperature is raised to about 2175° F. and held there, while still in a vacuum, for about 5 minutes. It is then quenched in nitrogen gas maintained at room temperature.

Following the quench, the ring form is tempered by heating it within a vacuum to about 1000° F. and holding it at that temperature for about 2 hours. This procedure is repeated so that the ring form is tempered twice. After the tempering the particle hardness of the ring form exceeds Rc 60, and the microstructure of the ring form consists of tempered martensite with M$_6$C carbides, but no retained austenite. Its porosity remains about 25%.

Next the ring form is machined by grinding it wet in soluble oil coolant to provide finish grinds on all of its surfaces. Then it is ultrasonically cleaned in a solvent. Thereafter the machined ring form is etched by immersing it in an acid etch for several minutes. The etch removes the Beilby layer and exposes the pores of the sintered alloy. After the etch, the ring form is immersed in a basic solution to neutralize the etchant, and this solution should be agitated at an ultrasonic frequency. Then the ring form is cleaned by immersing in a solvent which is likewise agitated ultrasonically. Thereafter the ring form is heated to remove the cleaning solution.

Finally, the ring form is impregnated with a lubricant, this being achieved by immersing it in a low viscosity lubricant for 2 hours, the lubricant being maintained at about 300° F. This completes the rib ring 10 or insert 22.

A lubricant impregnated block manufactured from M2 steel in accordance with the foregoing procedure such that it had a ground and etched surface was subjected to a dynamic load applied through a ground surface on another block of hardened wrought steel, the load being dynamic in the sense that sliding contact existed between the ground surfaces of the lubricant impregnated block and the wrought steel block. Indeed, the relative velocity between the two blocks amounted to 550 ft/min, while the initial Hertzian contact stress was 40,000 lbs/in$^2$. Without any lubrication, other than that derived from the pores of the lubricant impregnated block, the coefficient of friction between the two blocks was 0.05. The dynamic load, which existed at a pressure-velocity multiple of $22 \times 10^6$, was sustained for in excess of 30 minutes. This indicates that the bearing A operating under a similar dynamic load at the abutment face 30 of its rib ring 10 would remain operable for at least 30 minutes after interruption of its normal supply of lubricant.

The steel known as 46100 has essentially the following composition by weight:

| C | 1.00% | Ni | 2.0% |
|---|---|---|---|
| Mn | .25% | Mo | 0.5% |
| | | Fe | balance |

To manufacture the rib ring 10 or insert 22 from 46100 metal powder it is first blended with a lubricant, such as Acrawax lubricant, to lubricate the powder. Next it is compacted to a density of about 75% theoretical to produce a ring form. Thereafter the ring form is heated to 1350° to 1500° F. for 30 to 60 minutes in a vacuum to remove the lubricant. Then, the ring form is sintered in a vacuum at 2000° F. for 15 to 45 minutes. It is next cooled to about 900° F. in a vacuum and thereafter to room temperature in nitrogen gas.

The sintered ring form is thereupon heat treated by elevating its temperature to about 1500° F. for 15 to 45 minutes in an endothermic atmosphere having 0.25% $CO_2$ by volume and then quenching it in oil. Next it is tempered by heating it to about 360° F. for about one hour and allowing it to cool to ambient temperature. At this point its particle hardness exceeds Rc 60 and it contains essentially 80% tempered martensite and 20% of austenite, and it has about 25% porosity, or in other words is 75% of theoretical density.

Next, the 46100 ring form is machined in the same manner as the M2 ring form and is etched for several minutes to remove the Beilby layer. The ring form is thereafter neutralized, cleaned, heated, and impregnated with lubricant in the manner previously described, whereupon it becomes the rib ring 10 or insert 22.

An impregnated block formed from 46100 steel in accordance with the foregoing procedure was subjected to the same dynamic test as the M2 block. It sustained an initial Hertzian contact stress of 40,000 lbs/in$^2$ at 550 ft/min applied by a wrought steel block—or in other words a pressure-velocity multiple of $22 \times 10^6$—and the impregnated block endured that condition for over 30 minutes without any lubrication other than that derived from the pores of the block. The coefficient of friction between the two blocks amounted to 0.10.

The steel known as CBS1000M forms the subject of U.S. Pat. No. 3,954,517 and in its preferred composition has essentially the following composition by weight:

| C | .30%–.85% | Cr | 1.05% |
|---|---|---|---|
| Mn | .50% | Ni | 3.0% |
| Si | .50% | Mo | 4.5% |
| | | V | .35% |
| | | Fe | balance |

It is converted into a ring form and thereafter into a rib ring 10 or insert 22 using substantially the same procedure as 46100 powdered metal is converted into a rib ring 10 or insert 22.

A block of CBS1000M steel formed in accordance with the procedure for making the 46100 rib ring 10 and impregnated with oil was run against a block of wrought bearing steel and withstood an initial Hertzian stress of 40,000 lbs/in$^2$ at 550 ft/min, that is a pressure-velocity multiple of $22 \times 10^6$, for over 30 minutes without any additional lubrication. The coefficient of friction between the two blocks was 0.07.

In lieu of positioning a porous rib ring 10 at the front face of the cup 4, it may be placed at the back face of the cone 2 or it may take the form of an insert fitted to the cone. In either case it will have a slightly different configuration and will project outwardly from the large end of the cone raceway 12. Also, the insert 22, instead of being confined to a rabbet 21, may extend across the entire back face of the cup 4 much like the rib ring 10 at the opposite end of the cup 4. In that case the cup 4 would not contain a rabbet 21. Similarly, a modified insert may be installed in the cone at the small end of the cone raceway or it may take the form of a separate ring at the small end of the cone, that is against the cone front face.

M2, 46100 and CBS1000M steels are ideally suited for use in manufacturing the porous rib ring 10, for each of these steels when powdered and converted into a compacted and sintered rib ring 10 that is impregnated with oil will sustain a contact stress of 40,000 lbs/in$^2$ and a pressure-velocity multiple of $22 \times 10^6$ for at least 30 minutes in the absence of any additional lubrication when run against a smooth surface on wrought steel of bearing quality. When calculating this multiple, pressure is measured in lbs/in$^2$ and velocity in ft/min. Moreover, the coefficient of friction between the impregnated steel and the wrought bearing steel with no lubrication present other than that derived from the pores of the impregnated steel does not exceed 0.10. Certain other porous steels will suffice as well. These steels, however, should have properties which include high hardness, good wear resistance, high strength and preferably high temperature resistance and must also withstand a contact stress of 40,000 lbs/in$^2$ and pressure-velocity multiple of $22 \times 10^6$ and produce a coefficient of friction no greater than 0.10.

Instead of forming the rib ring 10 from powdered metal, the tapered rollers may be formed from powdered metal and the rib ring from wrought steel. In that case, the pores would be exposed at the large end faces of the rollers to release the lubricant onto the abutment face of the thrust rib. Other than that, essentially the same steps and materials are used to manufacture the powdered metal rollers as have been described in connection with the manufacture of the powdered metal rib ring 10. Also, both the rib ring and the rollers may be formed from powdered steel in accordance with the procedures previously described.

This invention is intended to cover all changes and modifications of the example of the invention herein chosen for purposes of the disclosure which do not constitute departures from the spirit and scope of the invention.

What is claimed is:

1. A tapered roller bearing capable of operation without significant damage for at least 30 minutes without external lubrication under a PV multiple of at least $22 \times 10^6$ where P is the contact stress between its rib ring and its rollers in units of psi and V is the relative velocity between its rib ring and its rollers in units of ft/min, comprising: an inner race having an outwardly presented raceway that is tapered; an outer race having an inwardly presented raceway that is tapered and surrounds the raceway of the inner race; tapered rollers arranged in a row between the tapered raceways of the two races and contacting those raceways along their bodies, the tapered rollers being formed from wrought steel and having large and small ends; said rib ring normally mounted in a fixed position with respect to one of the races and projecting generally radially beyond the large end of the raceway for that race, the rib ring having a smooth abutment face free from "Beilby layer" and having open pores, said abutment face being presented toward the large ends of the tapered rollers and against which the rollers bear at their large ends, the rib ring being formed from a powdered steel having a density of about 70% to about 85% of its theoretical density, a liquid lubricant in the pores of the rib ring in an amount sufficient to provide emergency lubrication for at least said 30 minutes, said rib ring having a dynamic coefficient of friction in contact with said rollers which does not exceed 0.10 in the presence only of said emergency lubrication, and the rib ring being capable of sustaining a contact stress, constituting said P, of 40,000 lbs/in$^2$ and when moved at said velocity V relative to said rollers being capable of enduring said PV multiple of $22 \times 10^6$ for 30 minutes in absence of lubrication other than the lubricant absorbed in the pores, where P is measured in lbs/in$^2$ and V in ft/min.

2. A bearing according to claim 1 wherein the rib ring is derived from M2 powdered steel.

3. A bearing according to claim 1 wherein the rib ring is derived from 46100 powdered steel.

4. A bearing according to claim 1 wherein the rib ring is derived from CBS1000M powdered steel.

5. A bearing according to claim 1 wherein the inner race and the outer race are formed from wrought steel.

6. A bearing according to claim 1 wherein the rib ring is positioned adjacent to the end of the outer race and projects inwardly past the large diameter end of the raceway for the outer race.

7. A tapered roller bearing capable of operation without significant damage for at least 30 minutes without external lubrication under a PV multiple of at least $22 \times 10^6$ where P is in units of psi and V is in units of ft/min, said bearing having a cone provided with an outwardly presented tapered raceway having a large end and a small end, a cup provided with an inwardly presented tapered raceway having a large end and a small end, tapered rollers located between the cup and cone and contacting said raceways along their tapered bodies, and a thrust rib located at the large end of one of the raceways in thrust-absorbing contact with said large ends of said rollers, said PV factor being calculated on the basis of the contact stress P on said thrust rib against said rollers and the velocity V of sliding contact between said thrust rib and said rollers, the improvement wherein:

said cup, said cone and said rollers are formed of wrought bearing steel material having a hardness in the order of about Rc 60 and of a density of substantially maximum theoretical value and said thrust rib is formed of powdered steel material having a density in the order of 70-85% of said maximum theoretical value and particle hardness in the order of about Rc 60, a quantity of lubricant absorbed in said thrust rib, said thrust rib having a load carrying capacity which is at least 40,000 psi and said powdered steel being different from said hardness wrought bearing steel to provide a coefficient of dynamic friction between said thrust rib and said rollers which is not more than 0.10 in the absence of lubrication therebetween other than the lubricant absorbed in the thrust rib, and said bearing being capable of operation without lubrication other than that provided by said quantity of lubricant for a period of time of at least 30 minutes without significant damage when operated under conditions which provide said PV multiple which is at least equal to $22 \times 10^6$ wherein P is in units of psi and V is in units of ft/min.

8. The structure according to claim 7 wherein the thrust rib is located at the end of the cup and projects inwardly past the large end of the cup raceway.

9. The structure according to claim 7 wherein the porous metal of the rib is selected from a group consisting essentially of M2 steel, 46100 steel, and CBS1000M steel.

10. A tapered roller bearing comprising: an inner race having an outwardly presented raceway that is tapered and has a large end and a small end; an outer race having an inwardly presented raceway that is tapered, has a large end and a small end, and surrounds the raceway of the inner race; tapered rollers arranged in a row between the tapered raceways of the two races and contacting those raceways along their bodies, said rollers having large ends and small ends; a cage which spaces the rollers along the raceways and at one end extends beyond the large ends of the rollers; and a rib ring normally mounted in a fixed position with respect to one of the races and projecting generally radially beyond the large end of the raceway for that race, the rib ring having an abutment face that is presented toward the large ends of the tapered rollers and against which the rollers bear at their large ends, the rib ring also having another surface which is located in close proximity to the end of the cage that projects beyond the large ends of the rollers with the other surface being positioned such that it serves to pilot the cage, the rib ring being formed from a compacted and sintered powdered metal that is porous, the rib ring having beed machined and thereafter etched along its abutment face and other surface to open the pores of the powdered metal along the abutment face and other surface, whereby the rib ring will absorb a liquid lubricant and will further release the absorbed lubricant at the abutment face and other surface so as to lubricate the end faces of the rollers and the piloted end of the cage should the bearing lose its normally supply of lubrication.

11. A bearing according to claim 10 and further comprising another ring located beyond the small ends of the raceways, the other ring having a guide surface and being formed from a porous metal, the pores of which are open along the guide surface, whereby the other ring will also absorb a liquid lubricant; and wherein the cage also extends beyond the small ends of the rollers where it is located in close proximity to the guide surface of the other ring, which surface serves to pilot the cage.

12. A bearing according to claim 11 wherein the outer race contains a rabbet located beyond the small end of its raceway, and the other ring is an insert that is fitted into the rabbet with the guide surface being presented toward the inner race.

* * * * *